United States Patent [19]

Viterbi et al.

[11] Patent Number: 5,442,627
[45] Date of Patent: Aug. 15, 1995

[54] NONCOHERENT RECEIVER EMPLOYING A DUAL-MAXIMA METRIC GENERATION PROCESS

[75] Inventors: Audrey Viterbi; Andrew J. Viterbi, both of La Jolla, Calif.

[73] Assignee: Qualcomm Incorporated, San Diego, Calif.

[21] Appl. No.: 83,110

[22] Filed: Jun. 24, 1993

[51] Int. Cl.⁶ .............................................. H04K 1/00
[52] U.S. Cl. ...................... 370/22; 370/19; 370/21; 375/205
[58] Field of Search ............... 370/19, 21, 22, 18; 380/28, 33, 34; 375/1; 371/37.1, 37.8, 37.9, 43

[56] References Cited

U.S. PATENT DOCUMENTS

| | | | |
|---|---|---|---|
| 3,678,204 | 7/1972 | Harmuth | 370/21 |
| 4,494,228 | 1/1985 | Gutleber | 370/21 |
| 5,103,459 | 4/1992 | Gilhousen et al. | 375/1 |
| 5,109,390 | 4/1992 | Gilhousen et al. | 375/1 |
| 5,159,608 | 10/1992 | Falconer et al. | 375/1 |
| 5,204,874 | 4/1993 | Falconer et al. | 375/1 |
| 5,204,876 | 4/1993 | Bruckert et al. | 375/1 |
| 5,305,349 | 4/1994 | Dent | 375/1 |

FOREIGN PATENT DOCUMENTS 9217011 10/1992 WIPO ................... H04K 1/100

OTHER PUBLICATIONS

Globecom '91 publication vol. 2 of 3 entitled "Performance of a CDMA Radio Communications System with Feed-Back Power Control and Multipath Dispersion" by Chang et al; published Dec. 1991; pp. 1017-1021.

1990 IEEE Military Communications Conference publication vol. 3 of 3 entitled "Performance of a RAKE Demodulator with Pre-decision Multipath Thresholding" by Kane et al; published Oct. 1990; pp. 11025-11029.

Primary Examiner—Melvin Marcelo
Assistant Examiner—Huy D. Vu
Attorney, Agent, or Firm—Russell B. Miller; Gregory D. Ogrod; Katherine W. White

[57] ABSTRACT

A method and apparatus for decoding an orthogonally encoded data signal in a noncoherent receiver system. The method is referred to as dual-maxima metric generation. It comprises the steps of sequentially searching for a maximum energy level in each of two subsets of a given set of symbol indexes and associated energy levels and calculating a difference of the two values to form a soft decision output value. The two subsets are identified by the binary value (either "0" or "1") of a given digit of the binary equivalent of the symbol index. The soft decision output value reflects a measure of confidence of the value of the corresponding digit of the original signal. The dual-maxima generator sequences through the steps one time for each binary digit of the original signal. The method allows the correlated energy from multiple receivers to be combined before the decoding of the signals, thus further reducing the complexity of the circuitry and improving the performance of the decoder.

29 Claims, 3 Drawing Sheets

NONCOHERENT RECEIVER EMPLOYING A DUAL-MAXIMA METRIC GENERATION PROCESS

BACKGROUND OF THE INVENTION

I. Field of the Invention

The present invention relates to communication systems which employ spread spectrum signals. More specifically, the present invention relates to a method and apparatus for processing orthogonal signals in a spread spectrum communication system.

II. Description of the Related Art

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. However the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, the disclosure of which is incorporated by reference.

In the just mentioned patent, a multiple access technique is disclosed where a large number of mobile telephone system users each having a transceiver communicate through satellite repeaters or terrestrial base stations (also referred to as cell-sites stations, cell-sites or for short, cells) using CDMA spread spectrum communication signals. In using CDMA communications, the frequency spectrum can be reused multiple times thus permitting an increase in system user capacity.

The CDMA modulation techniques disclosed in U.S. Pat. No. 4,901,307 offer many advantages over narrow band modulation techniques used in communication systems employing satellite or terrestrial channels. The terrestrial channel poses special problems to any communication system particularly with respect to multipath signals. The use of CDMA techniques permits the special problems of the terrestrial channel to be overcome by mitigating the adverse effect of multipath, e.g. fading, while also exploiting the advantages thereof.

The CDMA techniques as disclosed in U.S. Pat. No. 4,901,307 contemplates the use of coherent modulation and demodulation for both directions of the link in mobile-satellite communications. Accordingly, disclosed therein is the use of a pilot carrier signal as a coherent phase reference for the satellite-to-mobile link and the cell-to-mobile link. In the terrestrial cellular environment, however, the severity of multipath fading with the resulting phase disruption of the channel, as well as the power required to transmit a pilot carrier signal from the mobile, precludes usage of coherent demodulation techniques for the mobile-to-cell link. U.S. Pat. No. 5,103,459 entitled "SYSTEM AND METHOD FOR GENERATING SIGNAL WAVEFORMS IN A CDMA CELLULAR TELEPHONE SYSTEM", issued Jun. 25, 1990, assigned to the assignee of the present invention, the disclosure of which is incorporated herein by reference, provides a means for overcoming the adverse effects of multipath in the mobile-to-cell link by using noncoherent modulation and demodulation techniques.

In a CDMA cellular telephone system, the same frequency band can be used for communication in all cells. The CDMA waveform properties that provide processing gain are also used to discriminate between signals that occupy the same frequency band. Furthermore, the high speed pseudonoise (PN) modulation allows many different propagation paths to be separated, provided the difference in path delays exceed the PN chip duration, i.e. 1/bandwidth. If a PN chip rate of approximately 1 MHz is employed in a CDMA system, the full spread spectrum processing gain, equal to the ratio of the spread bandwidth to the system data rate, can be employed against paths that differ by more than one microsecond in path delay from the desired path. A one microsecond path delay differential corresponds to a differential path distance of approximately 1,000 feet. The urban environment typically provides differential path delays in excess of one microsecond, and up to 10-20 microseconds are reported in some areas. Multipath fading is not totally separated by using CDMA discrimination techniques because there will occasionally exist paths with delay differentials of less than the PN chip duration for the particular system. Signals having path delays on this order cannot be distinguished in the demodulator, resulting in some degree of fading.

Diversity is one approach for mitigating the deleterious effects of fading. It is, therefore, desirable that some form of diversity be provided which permits a system to reduce fading. Three major types of diversity exist: time diversity, frequency diversity and space diversity.

Time diversity can best be obtained by the use of repetition, time interleaving, and error correction and detection coding which like repetition introduces redundancy. A system comprising the present invention may employ each of these techniques as a form of time diversity.

CDMA by its inherent nature of being a wideband signal offers a form of frequency diversity by spreading the signal energy over a wide bandwidth. Therefore, frequency selective fading affects only a small part of the CDMA signal bandwidth.

Space or path diversity is obtained by providing multiple signal paths through simultaneous links from a mobile unit through two or more cell-sites usually by employing two or more antenna elements. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "SOFT HANDOFF IN A CDMA CELLULAR TELEPHONE SYSTEM", issued Mar. 21, 1992 and U.S. Pat. No. 5,109,390 entitled "DIVERSITY RECEIVER IN A CDMA CELLULAR TELEPHONE SYSTEM", issued Apr. 28, 1992, both assigned to the assignee of the present invention.

The deleterious effects of fading can be further controlled to a certain extent in a CDMA system by controlling transmitter power. A system for cell-site and mobile unit power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM", issued Oct. 8, 1991, also assigned to the assignee of the present invention.

The CDMA techniques as disclosed in U.S. Pat. No. 4,901,307 entitled "SPREAD SPECTRUM MULTIPLE ACCESS COMMUNICATION SYSTEM USING SATELLITE OR TERRESTRIAL REPEATERS", issued Feb. 13, 1990 and assigned to the assignee of the present invention, contemplate the use of relatively long PN sequences with each user channel being assigned a different PN sequence. The cross-correlation between different PN sequences and the auto-correlation of a PN sequence, for all time shifts other than zero, both have a nearly zero average value which allows the different user signals to be discriminated upon reception. (Autocorrelation and cross-correlation requires logical "0" take on a value of "1" and logical "1" take on a value of "−1" or a similar mapping in order to obtain a zero average value.)

However, such PN signals are not orthogonal. Although the cross-correlations essentially average to zero, for a short time interval such as an information bit time the cross-correlation is a random variable with a binomial distribution. As such, the signals interfere with each other much the same as if they were wide bandwidth Gaussian noise at the same power spectral density. Thus the other user signals, or mutual interference noise, ultimately limits the achievable system user capacity.

It is well known in the art that a set of n orthogonal binary sequences, each of length n, for n any power of 2 can be constructed, see *Digital Communications with Space Applications*, S. W. Golomb et al., Prentice-Hall, Inc., 1964, pp. 45–64. In fact, orthogonal binary sequence sets are also known for most lengths which are multiples of four and less than two hundred. One class of such sequences that is easy to generate is called the Walsh function, also known as Hadamard matrices.

A Walsh function of order n can be defined recursively as follows:

$$W(n) = \begin{vmatrix} W(n/2), & W(n/2) \\ W(n/2), & W'(n/2) \end{vmatrix}$$

where W' denotes the logical complement of W, and $W(1) = |0|$. Thus, $$W(2) = \begin{vmatrix} 0, & 0 \\ 0, & 1 \end{vmatrix}.$$

$$W(4) = \begin{vmatrix} 0, & 0, & 0, & 0 \\ 0, & 1, & 0, & 1 \\ 0, & 0, & 1, & 1 \\ 0, & 1, & 1, & 0 \end{vmatrix}, \text{ and}$$

$$W(8) = \begin{vmatrix} 0, & 0, & 0, & 0, & 0, & 0, & 0, & 0 \\ 0, & 1, & 0, & 1, & 0, & 1, & 0, & 1 \\ 0, & 0, & 1, & 1, & 0, & 0, & 1, & 1 \\ 0, & 1, & 1, & 0, & 0, & 1, & 1, & 0 \\ 0, & 0, & 0, & 0, & 1, & 1, & 1, & 1 \\ 0, & 1, & 0, & 1, & 1, & 0, & 1, & 0 \\ 0, & 0, & 1, & 1, & 1, & 1, & 0, & 0 \\ 0, & 1, & 1, & 0, & 1, & 0, & 0, & 1 \end{vmatrix}.$$

A Walsh sequence or code is one of the rows of a Walsh function matrix. A Walsh function matrix of order n contains n sequences, each of length n bits.

A Walsh function metric of order n (as well as other orthogonal functions) has the property that over the interval of n code symbols, the cross-correlation between all the different sequences within the set is zero, provided that the sequences are time aligned with each other. This can be seen by noting that every sequence differs from every other sequence in exactly half of its bits. It should also be noted that there is always one sequence containing all zeroes and that all the other sequences contain half ones and half zeroes.

Walsh codes can be used to provide orthogonality between the users so that mutual interference is reduced, allowing higher capacity and better link performance. With orthogonal codes, the cross-correlation is zero over a predetermined time interval, resulting in no interference between the orthogonal codes, provided only that the code time frames are time aligned with each other.

To obtain the benefit of the orthogonal Walsh codes, the transmitter of a system may map code symbols into corresponding Walsh codes. For example a three bit symbol could be mapped into the eight sequences of W(8) given above. An "unmapping" of the Walsh encoded signals into an estimate of the original code symbols must be accomplished by the receiver of the system. A preferred "unmapping" or selection process produces soft decision data which can be provided to a decoder for maximum likelihood decoding.

A correlation receiver is used to perform the "unmapping" process. In such a receiver a correlation of the received signal with each of the possible mapping values is performed. Selection circuitry is employed to select the most likely correlation value, which is scaled and provided as soft decision data.

A spread spectrum receiver of the diversity or "Rake" receiver design comprises multiple data receivers to mitigate the effects of fading. Typically each data receiver is assigned to demodulate a different path propagation of the signal. In the demodulation of signals modulated according to an orthogonal signaling scheme, each data receiver correlates the received signal with each of the possible mapping values. Selection circuitry within each data receiver then selects the most likely correlation value. The values selected from all of the data receivers are scaled and combined to produce soft decision data.

In the just described process the selection circuitry injects a nonlinearity into the decoding process which may result in inaccurate soft decision data. Furthermore, the standard selection circuit can require a plurality of functions which may require substantial circuitry and thus increase the complexity, size, power consumption, and cost of a system, particularly when repeated in each data receiver.

It is therefore desirable to provide in a spread spectrum receiver of the type just described an enhanced decision process which eliminates nonlinearities associated with such selection circuitry. Since the selection circuitry is employed in each data receiver, it is further desirable to combine the functions performed by the selection circuitry into a single processing element to avoid the associated disadvantages of such redundant circuitry.

The present invention is thus an improved alternative method and apparatus for accurately converting orthogonally encoded data signals into soft decision data using a set of simple functions. The benefit of the present invention is increased when it is incorporated into a system employing multiple data receivers.

SUMMARY OF THE INVENTION

The present invention is a novel and improved method and apparatus for decoding an orthogonally encoded data signal to produce soft decision data. This method is particularly applicable to receivers where multiple propagations of the received signal are demodulated and combined for providing as soft decision data. The method allows the correlated energy from multiple receivers to be linearly combined before the decoding thus achieving a reduction in circuitry and complexity and an improvement in performance.

In an exemplary implementation of the present invention in a diversity receiver, multiple data receivers each demodulate a different propagation of the signal. In each data receiver the signal is correlated with each possible mapping of the data to produce a corresponding correlation energy value. Thus, associated with each correlation energy value is a symbol index value. The correlation energy values of the same symbol index from the multiple data receivers are then summed and provided for metric generation. From the metrics, soft decision data is produced and provided for decoding in a Viterbi decoder.

The method for metric generation employed in the present invention is referred as dual-maxima metric generation. The method comprises the steps of searching for a maximum energy level value in each of two subsets of a given set of symbol indexes and associated energy level values, and calculating a difference of the two maximum energy level values to form a soft decision output value. The two subsets are identified by the binary value (either "0" or "1") of a given digit of the binary equivalent of the symbol index. The soft decision output value reflects a measure of confidence of the value of the corresponding digit of the original signal. The dual-maxima generator Sequences through the steps one time for each binary digit of the original signal.

BRIEF DESCRIPTION OF THE DRAWINGS

The features, objects, and advantages of the present invention will become more apparent from the detailed description set forth below when taken in conjunction with the drawings.

DETAILED DESCRIPTION OF THE PREFERRED EMBODIMENTS

Figure 1:
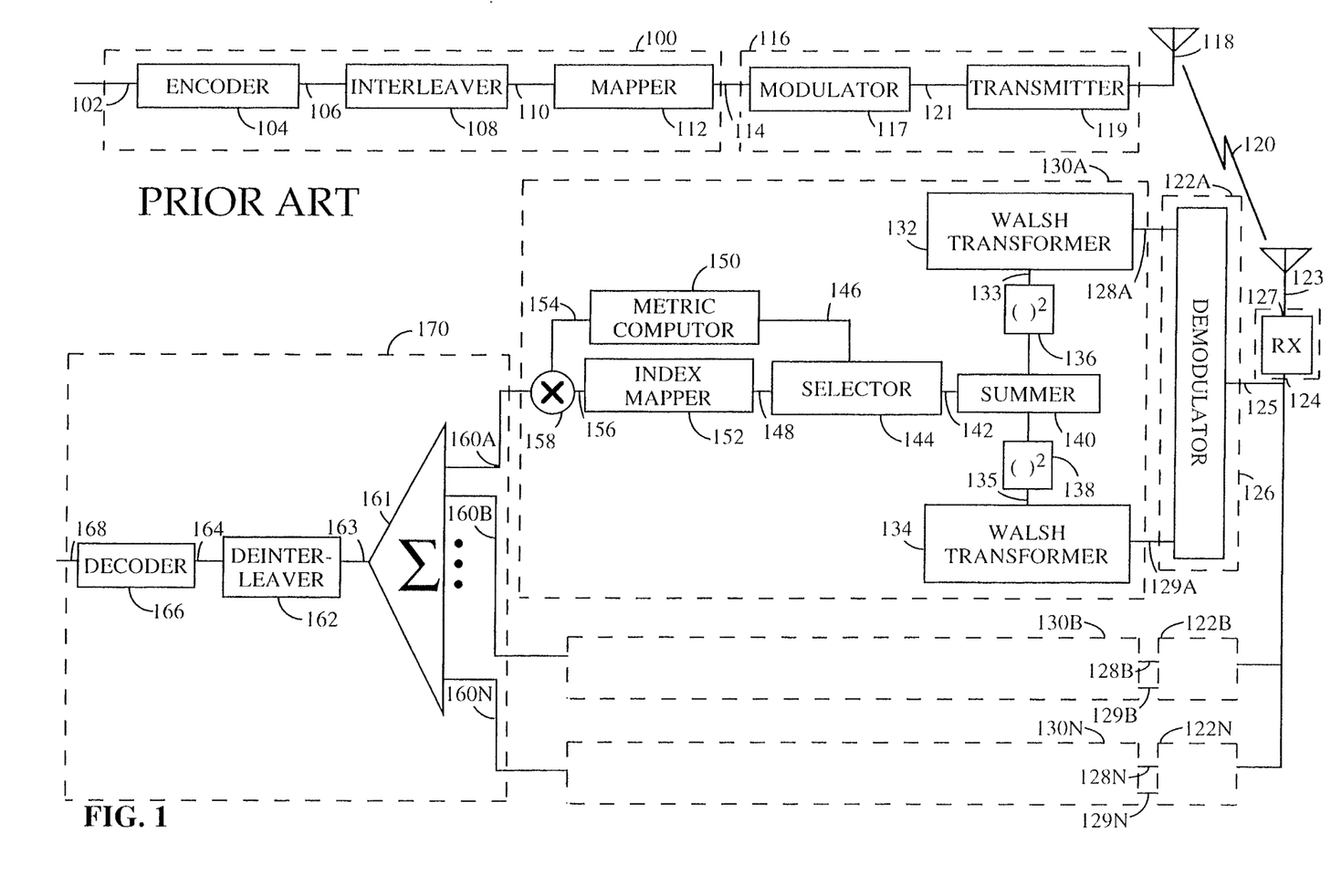
FIG. 1 is an block diagram of a prior art communication system using orthogonal signaling and standard selector decoding.

Referring now to FIG. 1, a prior art system for using orthogonal codes in encoding and decoding in a communication system is shown. In encoding portion 100 of the communication system, traffic channel data bits 102 are input to encoder 104 at a particular bit rate (e.g., 9.6 kbit/second). The input traffic channel data bits can include either analog voice signals converted to digital data by a vocoder, pure digital data, or a combination of the two types of data. Encoder 104 encodes traffic channel data bits 102 into data symbols at a fixed encoding rate with an encoding algorithm which facilitates subsequent maximum likelihood decoding of the data symbols into data bits (e.g. convolution or block coding algorithms). For example, encoder 104 encodes traffic channel data bits 102 (received at a rate of 9.6 kbits/second) at a fixed encoding rate of one data bit to three data symbols (i.e. $\frac{1}{3}$) such that encoder 104 outputs data symbols 106 at a 28.8 killasymbols/second rate.

Data symbols 106 are then input into interleaver 108. Interleaver 108 block interleaves input data symbols 106 at the symbol level. In interleaver 108, the data symbols are individually input into a matrix which defines a predetermined size block of data symbols. The data symbols are input into locations within the matrix so that the matrix is filled in a column by column manner. The data symbols are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 110 are output by interleaver 108 at the same data symbol rate that they were input (e.g., 28.8 ksymbols/second). The predetermined size of the block of data symbols defined by the matrix is derived from the maximum number of data symbols which can be transmitted at a predetermined chip rate within a predetermined length transmission block. For example, if data symbols 106 are output from encoder 104 at a 28.8 ksymbols/second rate, then the maximum predetermined chip rate for transmitting data symbols 106 is 28.8 ksymbols/second. Further, for example, if the predetermined length of the transmission block is 20 milliseconds, then the predetermined size of the block of data symbols is 28.8 ksymbols/second times 20 milliseconds which equals 576 data symbols which defines a 18 by 32 matrix.

Interleaved data symbols 110 are then input to mapper 112. The mapper 112 derives a sequence of fixed length orthogonal codes 114 (e.g., 64 ary Walsh codes) from interleaved data symbols 110. For example in 64-ary orthogonal code signaling, interleaved data symbols 110 are grouped into sets of six to select one out of 64 orthogonal codes to represent the set of six data symbols. These 64 orthogonal codes preferably correspond to Walsh codes from a 64 by 64 Hadamard matrix wherein a Walsh code is a single row or column of the matrix. Mapper 112 outputs a sequence of Walsh codes 114 which correspond to input data symbols 110 at a fixed rate (e.g., 307.2 ksymbols/second).

The sequence of Walsh codes 114 is output from encoding portion 100 of the communication system and input to a modulating and transmitting portion 116 of the communication system. Sequence 114 is prepared for transmission over a communication channel by modulator 117 and output as analog modulated data 121. Analog modulated data 121 is processed for RF transmission by transmitter 119 and is subsequently provided to antenna 118 for transmission over a communication channel 120.

Modulator 117 preferably prepares sequence 114 for direct sequence code division spread spectrum transmission by first spreading sequence 114 with a long spreading code (e.g. PN code). The spreading code is a user specific sequence of symbols or unique user code which is output at a fixed chip rate (e.g., 1,228 Mchips/second). In addition to providing an identification as to which user sent encoded traffic channel data bits over communication channel 120, the unique user code enhances the security of the communication in the communication channel by scrambling the encoded traffic channel data bits. In addition, the user code spread encoded data bit (i.e. data symbols) are spread by a pair of short spreading codes (i.e. short when compared to the long spreading code) to generate an I-channel and Q-channel code spread sequence. The I-channel and Q-channel code spread sequences are used to bi-phase modulate a quadrature pair of sinusoids by driving the power level controls of the pair of sinusoids. The sinusoids output signals are summed, bandpass filtered, translated to an RF frequency, amplified, filtered by transmitter 119 and radiated by antenna 118 to complete transmission of traffic channel data bits 102 in communication channel 120.

Receiving portion 124 of the communication system receives the transmitted spread spectrum signal from over communication channel 120 through antenna 123. Receiving portion 124 comprises a receiver 127 which filters, demodulates, and translates the signal from the RF frequencies. Receiver 127 further samples, at a predetermined rate (e.g., 1.2288 Msamples/second) the processed received signal to provide data samples 125 to a set of demodulator portions 122A–122N. Demodulator portions 122A–122N output data to transformer portions 130A–130N, respectively. Each demodulator portion and transformer portion pair can be referred to as "fingers" using common Rake receiver terminology.

Within each demodulator portion 122A–122N, demodulator 126 preferably demodulates a distinct signal contained within data samples 125. In demodulator portions 122A–122N, the in-phase sampled signal and quadrature sampled signal are independently despread by correlating the received sampled signals with the short spreading codes and the long spreading code by demodulator 126. This results in despread in-phase 128 and quadrature 129 sampled signals which are sampled a predetermined rate (e.g., 307.2 ksamples/second) so that a sequence of (four) samples of the received spread spectrum signal is despread and/or represented by a single data sample.

From each demodulator portion 122A–122N, in-phase 128 and quadrature 129 sampled signals are independently input to a corresponding decoding portion 130A–130N of the communication system, each of which non-coherently detects and decodes sampled signals 128 and 129 into estimated data bits 160A–160N. In order to decode sampled signals 128 and 129, predetermined length groups (e.g., 64 sample length groups) of sampled signals are independently input to orthogonal code transformers (e.g. fast Hadamard transformers) 132 and 134, respectively. Orthogonal code transformers 132 and 134 output a plurality of transformer output signals 133 and 135, respectively (e.g. when 64 sample length groups are input, then 64 transformer output signals are generated). Each transformer output signal corresponds to a measure of confidence that a particular group of sampled signals corresponds to a particular orthogonal code from within a set of mutually orthogonal codes. In addition, each transformer output signal has an associated index data symbol which indicates which particular orthogonal code from within a set of mutually orthogonal codes that the transformer output signal corresponds to (e.g. when 64 sample length groups are input, then a 6 bit length index data symbol can be associated with each transformer output signal).

Each transformer output signal within the groups of transformer output signals 133 and 135 is squared by transformer output signal squaring mechanisms 136 and 138, respectively. Subsequently, a group of decision values 142 is generated (e.g. when 64 transformer output signals are generated, then 64 decision values are generated) by adding mechanism 140 which adds together each pair of squared transformer output signals (i.e. one from each of the transformer output signal squaring mechanisms 136 and 138) having associated index data symbols which indicate that the transformer output signals correspond to the same orthogonal code thus producing an energy level associated with each particular orthogonal code.

Decision or energy values 142 and associated index data symbols are input to selection mechanism 144 which selects the maximum decision value from the group of energy values 142. It should be noted that the associated index data symbols need not be generated for input to selection mechanism 144 when energy values 142 are provided in a predetermined order. In this case, selection mechanism 144 associates the proper index data symbol with the appropriate energy value in coordination with a predetermined ordering scheme. Selected decision value 146 is input to metric computation mechanism 150 which scales the selected decision value to scaling factor 154 which can be used as a scaling factor in forming an individual soft decision data which can subsequently be used in forming soft decision transition metrics for maximum likelihood decoding techniques. The index data symbol associated with selected decision value 148 is input to index mapping mechanism 152 which maps the index data symbol into a plurality of ±1 soft decision bits 156 (e.g., a 6 bit length index data symbol maps into 6 soft decision bits). Multiplier 158 multiplies each of the plurality of ±1 soft decision bits 156 by scaling factor 154 to form individual soft decision data 160 for each soft decision bit (e.g., 6 soft decision bits from 6 individual soft decision data). The individual soft decision data are formed at a predetermined rate related to the number of metrics formed per group of data samples and the rate that the data samples are input to the orthogonal transformer (e.g., if the data samples are input at 307.2 ksamples/second and 6 individual data are formed/64 data samples, then the individual soft decision data are formed at 28.8 kmetrics/second).

Each of the individual soft decision data 160A–160N from the corresponding fingers are input into decoder portion 170 where individual soft decision data 160A–160N are added by summer 161 producing a single set of aggregate soft decision data 163. Aggregate soft decision data 163 are then input into deinterleaver 162 which deinterleaves aggregate soft decision data 163 at the individual data level. In deinterleaver 162, aggregate soft decision data 163 are individually input into a matrix which defines a predetermined size block of soft decision data. The soft decision data are input into locations within the matrix so that the matrix is filled in a row by row manner. Deinterleaved soft decision data 164 are individually output from locations within the matrix so that the matrix is emptied in a column by column manner. Deinterleaved soft decision data 164 are output by deinterleaver 162 at the same rate that they were input (e.g., 28.8 kmetrics/second).

The predetermined size of the block of soft decision data defined by the deinterleaver matrix is derived from the maximum rate of sampling data samples from the spread spectrum signal received within the predetermined length transmission block, the number of data samples represented by each group of data samples, bit length of the index data symbol associated with the soft decision value selected for each group of data samples input to the orthogonal code transformer, and the number of soft decision data formed from the selected soft decision value and associated index data symbol. For example, if the maximum rate of sampling data samples from the received spread spectrum signal is 307,200 data samples/second, the predetermined length of the transmission block is 20 millisecond, the bit length of the selected index data symbol per group of data samples is 6 bit/index data symbol associated with a group of 64 samples, and the number of soft decision data formed per index data symbol is 6 individual data/index data symbol, then the predetermined size of the block of soft decision data is 307,200 samples/second times 20 milliseconds times 6 bit index data symbol/index data symbol times one index data symbol/64 samples times 6 individual data/6 bit index data symbol which equals 576 soft decision data.

Deinterleaved soft decision data 164 are input to decoder 166 which uses maximum likelihood decoding techniques to generate estimated traffic channel data bits 168. The maximum likelihood decoding techniques may be augmented by using an algorithm which is substantially similar to a Viterbi decoding algorithm. Decoder 166 uses a group of individual soft decision data 164 to form a set of soft decision transition metrics for use at each particular time state of maximum likelihood sequence estimation decoder 166. The number of soft decision data 164 in the group used to form each set of soft decision transition metrics corresponds to the number of data symbols 106 at the output of convolution encoder 104 generated from each traffic channel data bit 102. The number of soft decision transition metrics in each set is equal to two raised to the power of the number of soft decision data 164 in each group. For example, when a ⅓ convolutional encoder is used in the transmitter, three data symbols 106 are generated from each traffic channel data bit 102. Thus, decoder 166 uses groups of three individual soft decision data 164 to form eight soft decision transition metrics for use at each time state in the maximum likelihood sequence estimation decoder 166. Estimated data bits 168 are generated at a rate related to the rate that soft decision data 164 are input to decoder 166 and the fixed rate used to originally encode traffic channel data bits 102 (e.g., if the soft decision data are input at 28.8 kmetrics/second and the original encoding rate was ⅓ then estimated data bits 168 are output at a rate 9600 bits/second).

Thus, a communication system for using orthogonal codes in encoding and decoding has been described above with reference to FIG. 1. In summary, the communication system includes a first portion which encodes input data bits into data symbols, interleaves the data symbols in a symbol by symbol manner, maps the interleaved symbols into orthogonal codes, modulates and transmits the orthogonal codes over a communication channel. The communication system further includes a second portion which receives and demodulates a signal from over the communication channel, transforms groups of samples of the demodulated signal into a group of measures of confidence that each particular group of sample corresponds to a particular orthogonal code from within a set of mutually orthogonal codes, selecting the one largest measure of confidence from each group of measures of confidence and an index data symbol which identifies the particular orthogonal code corresponding to the selected measure of confidence, generating soft decision data from each selected measure of confidence and associated index data symbol, deinterleaving the soft decision data within each received transmission block, subsequently generating soft decision transition metrics from groups of deinterleaved individual soft decision data, and subsequently generating estimated data bits from the soft decision metrics by using maximum likelihood decoding techniques.

The present invention replaces the selection circuitry comprising selector 144, metric computer 150, index mapper 152, and multiplier 158 with a dual-maxima metric generator. The dual-maxima metric generator uses a simple method and apparatus to form soft decision transition metrics for maximum likelihood decoding techniques. The dual-maxima metric generator of the present invention is useful in single finger receivers for removing nonlinearities associated with metrics generated using the selection circuitry. The advantages of the present invention are increased when multiple receivers are used and the selection circuitry of all receivers is replaced with a single dual-maxima metric generator.

Figure 2:
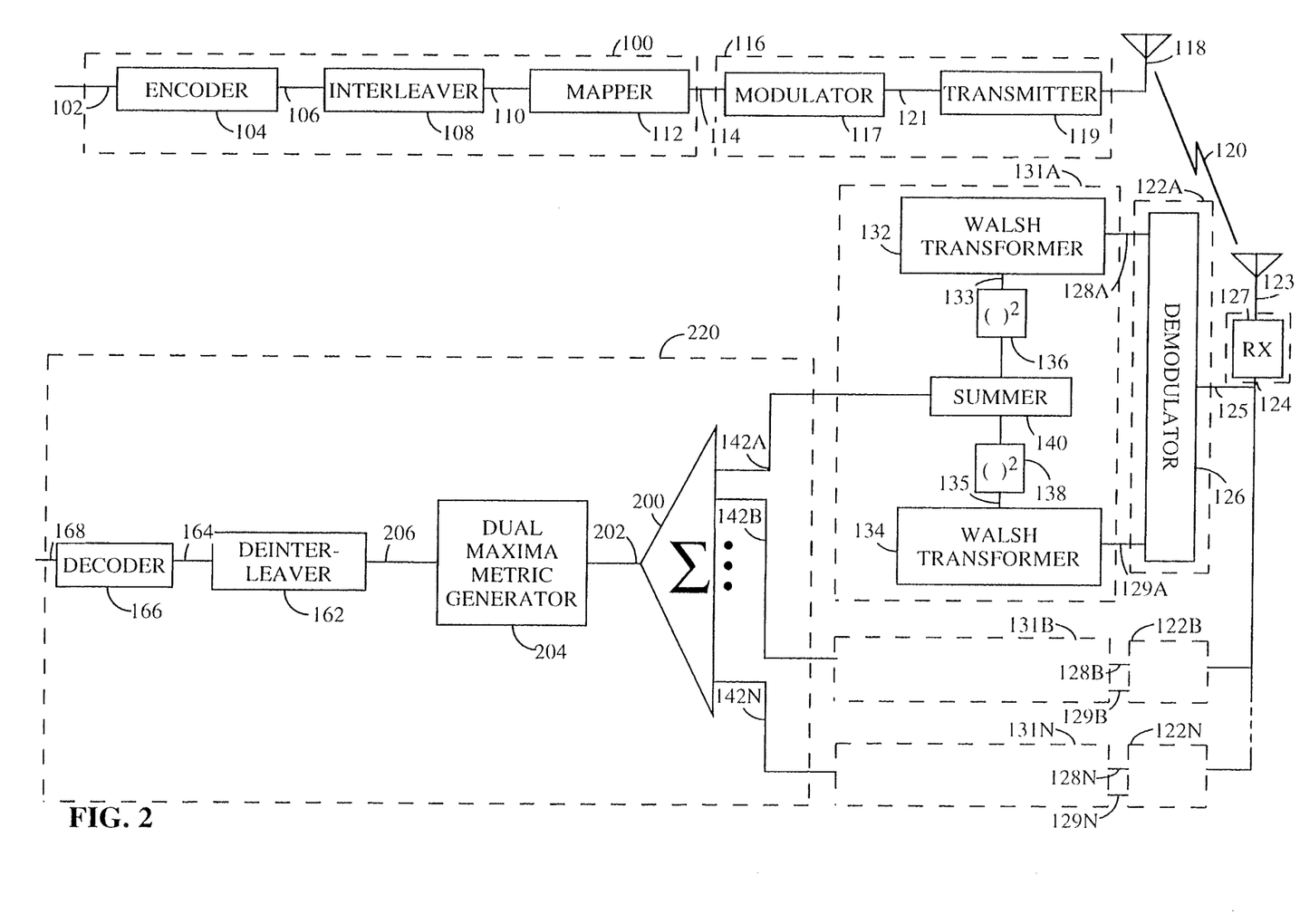
FIG. 2 is a block diagram of a communication system using orthogonal signaling and employing the novel dual-maxima metric generator of the present invention.

FIG. 2 illustrates an exemplary embodiment of the present invention. The transmitter circuitry of FIG. 2 is identical to the transmitter circuitry of FIG. 1 and the receiving portion of FIG. 2 receives the same transmitted spread spectrum signal over the same communication channel as FIG. 1. In FIG. 2, receiving portion 124 of the communication system receives the transmitted spread spectrum signal from over communication channel 120 through antenna 123. Receiver 127 of receiving portion 124 filters, amplifies, and translates the signal from the RF frequencies. The received signal is again sampled into data samples 125 by receive circuitry 127 at a predetermined rate (e.g., 1.2288 Msamples/second) and presented to a set of demodulator portions 122A-122N. Demodulator portions 122A-122N output data to transformer portions 131A-131N.

In the same manner as FIG. 1, predetermined length groups (e.g., 64 sample length groups) of sampled signals 128 and 129 are independently input to orthogonal code transformers (e.g. fast Hadamard transformers) 132 and 134, respectively. Orthogonal code transformers 132 and 134 output a plurality of transformer output signals 133 and 135, respectively (e.g. when 64 sample length groups are input, then 64 transformer output signals are generated). Each transformer output signal corresponds to a measure of confidence that a particular group of sampled signals corresponds to a particular orthogonal code from within the set of mutually orthogonal codes. In addition, each transformer output signal has an associated index data symbol, either explicitly or implicitly, which indicates which particular orthogonal code from within the set of mutually orthogonal codes that the transformer output signal corresponds to (e.g. when 64 sample length groups are input, then a 6 bit length index data symbol can be associated with each transformer output signal).

Each transformer output signal within the groups of transformer output signals 133 and 135 is squared by transformer output signal squaring mechanisms 136 and 138, respectively. Subsequently, a group of decision values 142 is generated (e.g. when 64 transformer output signals are generated, then 64 decision values are generated) by adding mechanism 140 which adds together each pair of squared transformer output signals (i.e. one from each of the transformer output signal squaring mechanisms 136 and 138) having associated index data symbols which indicate that the transformer output signals correspond to the same orthogonal code thus producing an energy level associated with each particular orthogonal code.

In FIG. 2, the group of decision values 142A-142N corresponding to the energy levels are directly added together according to their associated symbol indexes in adder 200, differing from the system of FIG. 1. Combined output data 202 are input into dual-maxima metric generator 204 and processed as explained in detail below. Dual-maxima metric generator 204 produces a single set of aggregate soft decision data 206.

Each of the group of decision values 142A-142N may be transferred to adder 200 in either a series or parallel manner. The associated symbol index corresponding to each decision value may be explicitly transferred in series or in parallel or may be implicit to the signaling format. Likewise, combined output data 202 and aggregate soft decision data 206 may also be transferred either in series or in parallel.

Aggregate soft decision data 206 are then input into deinterleaver 162 which deinterleaves aggregate soft decision data 206 at the individual data level. In deinterleaver 162, aggregate soft decision data 206 are individually input into a matrix which defines a predetermined size block of soft decision data. The soft decision data are input into locations within the matrix so that the matrix is filled in a row by row manner. Deinterleaved soft decision data 164 are individually output from locations within the matrix so that the matrix is empties in a column by column manner. Deinterleaved soft decision data 164 are output by deinterleaver 162 at the same rate that they were input (e.g., 28.8 kmetrics/second). In the same manner as FIG. 1, deinterleaved soft decision data 164 are input to decoder 166 which uses maximum likelihood decoding techniques to generate estimated traffic channel data bits 168.

Dual-maxima metric generator 204 receives a summed energy value associated with each symbol index from summer 200. Each set of data presented to dual-maxima metric generator 204 is comprised of two parts: a label or other means of identification indicating the symbol index (e.g. $y_0$-$y_{63}$) and an associated value indicating the aggregate energy level for that symbol index, (e.g. $E(y_0)$-$E(y_{63})$ respectively). Again it should be noted that the associated symbol indexes need not actually be generated for input to dual-maxima metric generator 204 when the energy values are provided thereto in an predetermined order. In this case the symbol index is implicit to dual-maxima metric generator 204 for each summed energy value.

After acquiring an entire set of data, dual-maxima metric generator 204 begins to decode the orthogonal signals. Initally dual-maxima metric generator 204 searches the set of data for the energy of the symbol index having the maximum energy of all symbols having a "0" as a first digit of the binary equivalent of the symbol index. Dual-maxima metric generator 204 assigns the determined maximum energy value a label $Y_0^{(1)}$. Dual-maxima metric generator 204 then searches the set of data for the energy of the symbol index having the maximum energy of all symbols having a "1" as a first digit of the binary equivalent of the symbol index. Dual-maxima metric generator 204 assigns the determined maximum energy value a label $Y_1^{(1)}$. Then dual-maxima metric generator 204 forms a signed, quantized difference value $Y_0^{(1)}$-$Y_1^{(1)}$ which is assigned a label $D^1$. Dual-maxima metric generator 204 outputs the value $D^1$ to deinterleaver 162 as aggregate soft decision data 206.

Continuing in a like manner, dual-maxima metric generator 204 searches the set of data for the energy of the symbol index having the maximum energy of all symbols having a "0" as a second digit of the binary equivalent of the symbol index. Dual-maxima metric generator 204 assigns the determined maximum energy value a label $Y_0^{(2)}$. Dual-maxima metric generator 204 then searches the set of data for the energy of the symbol index having the maximum energy of all symbols having a "1" as a second digit of the binary equivalent of the symbol index. Dual-maxima metric generator 204 assigns the determined maximum energy value a label $Y_1^{(2)}$. Dual-maxima metric generator 204 forms a signed, quantized difference value $Y_0^{(2)}$-$Y_1^{(2)}$ which is assigned a label $D^2$. Dual-maxima metric generator 204 outputs the value $D^2$ to deinterleaver 162 as aggregate soft decision data 206. Dual-maxima metric generator 204 continues in a like manner generating the values $D^3$, $D^4$, $D^5$, and $D^6$.

Generally stated, using the labeling introduced above, the dual-maxima metric generator performs the following functions where n is the order (length) of the orthogonal sequence:

Receive:

$E(y_0)$ to $E(y_{2^n}-1)$ corresponding to energy levels for symbols $y_0$ to $y_{2^n}-1$ For k=1 to n:

Form:

$Y_0^{(k)}=E(y_x)$ where x is the index of the symbol with the maximum energy of all symbols ($y_0$ to $y_{2^n}-1$) with "0" as the kth digit of the binary equivalent of the symbol index $Y_1^{(k)}=E(y_x)$ where x is the index of the symbol with the maximum energy of all symbols ($y_0$ to $y_{2^n}-1$) with "1" as the kth digit of the binary equivalent of the symbol index Calculate:

$D^k=Y_0^{(k)}-Y_1^{(k)}$

Output: $D^k$

Next k

The order in which the set of $D^k$ are produced is not essential to the process for example the last digit (k=n) could be processed first. Also the process could be implemented to occur in parallel where more than one $D^k$ is calculated simultaneously.

The following example steps through the generally stated dual-maxima metric generation as described above using the data present in Table I. FIGS. 1 and 2 and associated explanation assumed a 64-ary orthogonal code signal mapping meaning that the interleaved data symbols are grouped into sets of six to select one out of 64 orthogonal codes. However, for the ease of explanation, a 16-ary orthogonal code signal mapping is used in following example. The data of Table I is an exemplary set of data received by a dual-maxima metric generator where the first column is the symbol index, the second column is the corresponding binary equivalent of the symbol index, and the third column is the associated energy output in a base 10 notation for purposes of explanation.

TABLE I

| Symbol Index | Binary Equivalent | Associated Energy |
|---|---|---|
| y0 | 0000 | 5 |
| y1 | 0001 | 8 |
| y2 | 0010 | 25 |
| y3 | 0011 | 12 |
| y4 | 0100 | 9 |
| y5 | 0101 | 35 |
| y6 | 0110 | 18 |
| y7 | 0111 | 100 |
| y8 | 1000 | 20 |
| y9 | 1001 | 11 |
| y10 | 1010 | 19 |
| y11 | 1011 | 32 |
| y12 | 1100 | 24 |
| y13 | 1101 | 7 |
| y14 | 1110 | 44 |
| y15 | 1111 | 29 |

Beginning with k=1 and sequencing through k=n, the dual-maximum metric generator begins by examining the data in two subsets as determined by the first digit of the binary equivalent of the symbol index. The dual-maxima metric generator forms $Y_0^{(1)}=100$, since 100 is the maximum associated energy of $y_0$, $y_1$, $y_2$, $y_3$, $y_4$, $y_5$, $y_6$, and $y_7$, each having a "0" as the first digit of the binary equivalent of the symbol index. The dual-maxima metric generator forms $Y_1^{(1)}=44$, since 44 is the maximum associated energy of $y_8$, $y_9$, $y_{10}$, $y_{11}$, $y_{12}$, $y_{13}$, $y_{14}$, and $y_{15}$, each having a "1" as the first digit of the binary equivalent of the symbol index. The dual-maxima metric generator calculates $D^1=Y_0^{(1)}-Y_1^{(1)}=56$ and outputs this value.

The dual-maxima metric generator then forms $Y_0^{(2)}=32$, since 32 is the maximum associated energy of $y_0$, $y_1$, $y_2$, $y_3$, $y_8$, $y_9$, $y_{10}$, and $y_{11}$, each having a "0" as the second digit of the binary equivalent of the symbol index. The dual-maxima metric generator forms $Y_1^{(2)}=100$, since 100 is the maximum associated energy of $y_4$, $y_5$, $y_6$, $y_7$, $y_{12}$, $y_{13}$, $y_{14}$, and $y_{15}$, each having a "1" as the second digit of the binary equivalent of the symbol index. The dual-maxima metric generator calculates $D^2=Y_0^{(2)}-Y_1^{(2)}=-68$ and outputs this value.

The dual-maxima metric generator then forms $Y_0^{(3)}=35$, since 35 is the maximum associated energy of $y_0$, $y_1$, $y_4$, $y_5$, $y_8$, $y_9$, $y_{12}$, and $y_{13}$, each having a "0" as the third digit of the binary equivalent of the symbol index. The dual-maxima metric generator forms $Y_1^{(3)}=100$, since 100 is the maximum associated energy of $y_2$, $y_3$, $y_6$, $y_7$, $y_{10}$, $y_{11}$, $y_{14}$, and $y_{15}$, each having a "1" as the third digit of the binary equivalent of the symbol index. The dual-maxima metric generator calculates $D^3=Y_0^{(3)}-Y_1^{(3)}=-65$ and outputs this value.

The dual-maxima metric generator then forms $Y_0^{(4)}=44$, since 44 is the maximum associated energy of $y_0$, $y_2$, $y_4$, $y_6$, $y_8$, $y_{10}$, $y_{12}$, and $y_{14}$, each having a "0" as the fourth digit of the binary equivalent of the symbol index. The dual-maxima metric generator forms $Y^{1(4)}=100$, since 100 is the maximum associated energy of $y_1$, $y_3$, $y_5$, $y_7$, $y_9$, $y_{11}$, $y_{13}$, and $y_{15}$, each having a "1" as the fourth digit of the binary equivalent of the symbol index. The dual-maxima metric generator calculates $D^4=Y_0^{(4)}-Y_1^{(4)}=-56$ and outputs this value.

Figure 3:
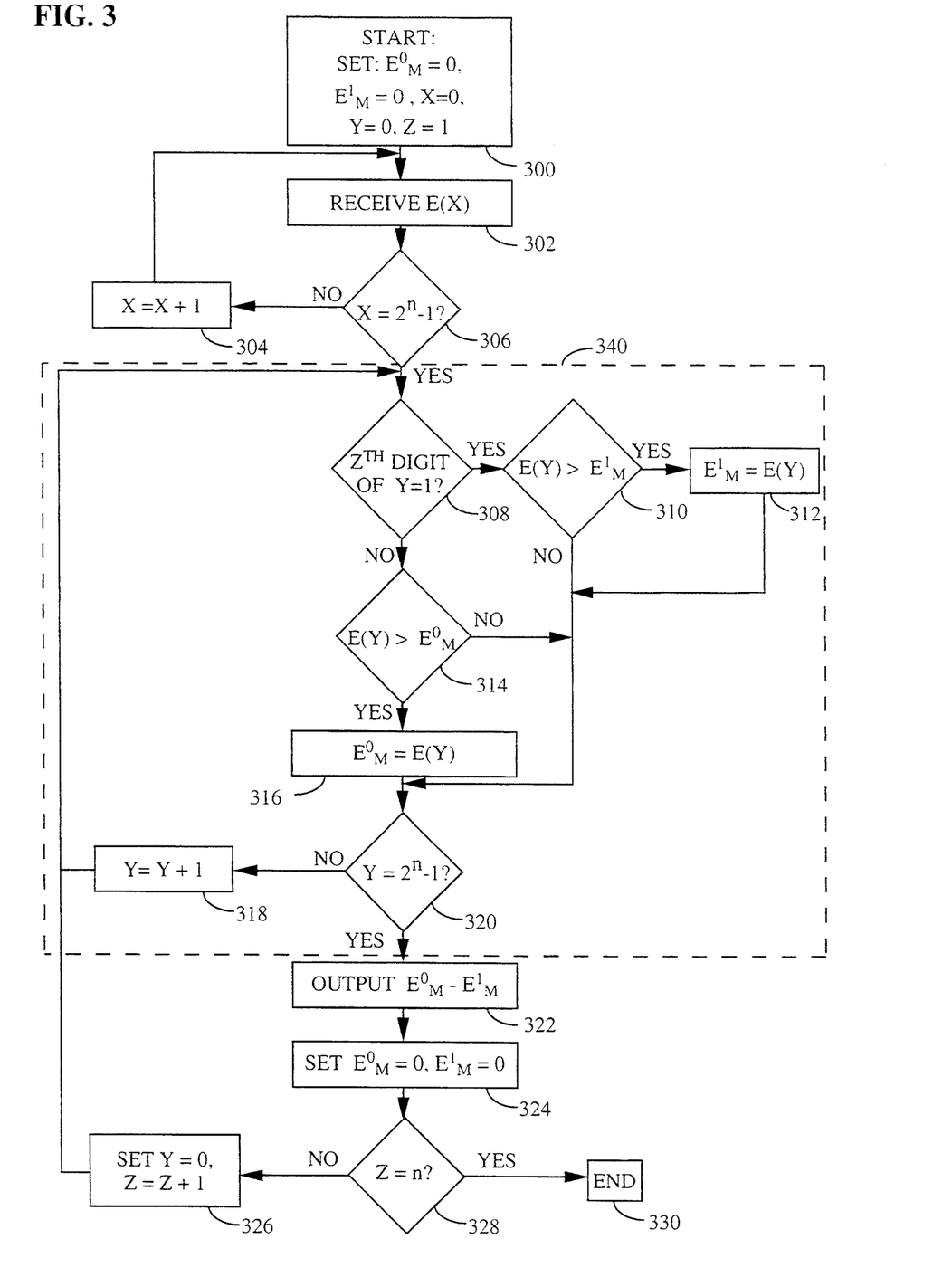
FIG. 3 illustrates in block diagram form a flow chart of a possible implementation of the functions of this invention.

FIG. 3 illustrates in block diagram form a flow chart for a possible implementation of the functions of this invention. The algorithm used by the inventive method or process shown in FIG. 3 assumes that n is the length of the orthogonal sequence, both X and Y are binary numbers, and that all processing is done serially. Block 300 begins by setting all variables to reset values. The process then flows to Block 302 where the energy values are received by the algorithm. Initially, Block 302 receives the first energy value and stores that value. The associated index symbol, indicated by X, in this case is inherent in the order that the energy values are received and the index value is not passed explicitly to the algorithm. Following Block 302, Block 305 determines whether an entire set of $2^n$ energy values has been received by the algorithm. If the last energy value has not been received, the index value X is incremented by Block 304 and Block 302 receives an energy value associated with the next symbol index.

Block 340, indicated by dashed block on FIG. 3, contains the portion of the flow chart that selects the maximum energy. The algorithm in Block 340 is a basic serial comparison process. There are many alternatives to the process of Block 340 which could be readily substituted. Block 308 determines the value of the digit in question, Z, for the index symbol in question, Y. Initially Y=0 and Z=1, and Block 308 determines that the first digit of 0 is 0 and the process continues to Block 314. Block 314 determines if the energy corresponding to the current symbol, E(Y), is greater than the maximum value previously stored. In the case of Y=0, the corresponding energy, E(0), is greater than $E^0{}_M$ which initially is 0 and Block 316 sets $E^0{}_M=E(0)$. If the value of E(Y) is not greater than the stored value $E^0{}_M$, then the process advances to Block 320. Block 320 determines if the last symbol index has been checked for maximum value for the current digit, Z. If the current symbol index, Y, is not the last one then Block 318 increments the symbol index and the process continues at Block 308.

On the second pass through Block 308, Y=1 and Z=1. Block 308 determines that the first digit of 1 is 1 and the process continues to Block 310. Block 310 determines if the energy corresponding to the current symbol, E(Y), is greater than the maximum value previously stored. In the case of Y=1, the corresponding energy, E(1), is greater than $E^1{}_M$ which initially is 0 and Block 312 sets $E^1{}_M=E(1)$. If the value of E(Y) is not greater than the stored value $E^1{}_M$, then the process advances to Block 320.

When the last symbol index is reached for the current digit, Z, then the process continues to Block 322. In Block 322, the difference in the two maximum stored values $(E^0{}_M-E^1{}_M)$ is calculated and the resultant soft decision signal is output. Block 324 resets the store energy values, $E^0{}_M$ and $E^1{}_M$, to 0.

Block 328 determines whether the last digit has been reached. If it has not, then Block 325 increments the current digit, Z, and resets the current symbol index, Y. If the last digit has been reached, then a soft decision has been generated for the code symbols as dictated by the set of received energy values and the dual-maxima metric generation process. The process terminates for this set of energies in Block 330.

The process described thus far assumes that the data values are searched to find the maximum value of all energy values having a binary equivalent of the symbol index with a common value. However alternative methods may be used which replace searching for the maximum energy value with other functions. For example, all energy values having a common value of a binary equivalent of the symbol index could be summed to produce a resultant value in place of the maximum value. In another example, the value could be formed by calculating the sum of an exponential function of each energy value. Indeed there are a variety of general functions that could be substituted for the maximum value function to produce valid results.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of decoding an orthogonally encoded data signal corresponding to an original data signal, said orthogonally encoded data signal having a fixed number of possible code values each having an index number wherein a binary equivalent of said index number corresponds to said original data signal, comprising the steps of:

receiving a set of energy values, each energy value corresponding to a respective one of said fixed number of code values and corresponding index number;

searching a first subset of said set of energy values for a maximum energy value wherein said first subset contains each of said energy values corresponding to an index number having a binary equivalent with a "0" as a preselected digit;

searching a second subset of said set of energy values for a maximum energy value wherein said second subset contains each of said energy values corresponding to an index number having a binary equivalent with a "1" as said preselected digit; and forming a difference between said maximum energy value of said first subset and said maximum energy of said second subset wherein said difference is a measure of confidence of the value of a particular digit of said original data signal.

2. The method of claim 1 further comprising the steps of:

searching a third subset of said set of energy values for a maximum energy value wherein said third subset contains each of said energy values corresponding to an index number having a binary equivalent with a "0" as a second preselected digit;

searching a fourth subset of said set of energy values for a maximum energy value wherein said fourth subset contains each of said energy values corresponding to an index number having a binary equivalent with a "1" as said second preselected digit; and forming a difference between said maximum energy value of said third subset and said maximum energy of said fourth subset wherein said difference is a measure of confidence of the value of a second particular digit of said original data signal.

3. The method of claim 1 wherein each energy value in said set of energy values is generated by an orthogonal code transformer.

4. The method of claim 1 wherein each energy value in said set of energy values is generated by summing a plurality of partial energy values corresponding to a like symbol index, each of said plurality of partial energy values corresponding to said like symbol index is generated by a different one of a plurality of orthogonal code transformers.

5. The method of claim 3 wherein said orthogonal code transformer comprises a fast Hadamard transformer.

6. The method of claim 4 wherein said plurality of orthogonal code transformers comprises a fast Hadamard transformer.

7. The method of claim 1 wherein said orthogonally encoded signal is a Walsh encoded signal.

8. The method of claim 1 wherein said measure of confidence represents a soft decision data value.

9. A method of decoding an orthogonally encoded data signal corresponding to an original data signal, said orthogonally encoded data signal having a fixed number of possible code values each having an index number wherein a binary equivalent of said index number corresponds to said original data signal, comprising the steps of:

(a) receiving a set of energy values, each energy value corresponding to a respective one of said fixed number of code values and corresponding index number;

(b) searching a first subset of said set of energy values for a maximum energy value wherein said first subset contains each of said energy values corresponding to an index number having a binary equivalent with a "0" as a first digit;

(c) searching a second subset of said set of energy values for a maximum energy value wherein said second subset contains each of said energy values corresponding to an index number having a binary equivalent with a "1" as a first digit;

(d) forming a difference of said maximum energy value of said first subset and said maximum energy of said second subset wherein said difference is a measure of confidence of the value of a particular digit of said original data signal; and (e) repeating steps (b), (c), and (d) for each subsequent digit of said index number.

10. A method of decoding an orthogonally encoded data signal corresponding to an original data signal, said orthogonally encoded data signal having a fixed number of possible code values each having an index number wherein a binary equivalent of said index number corresponds to said original data signal, comprising the steps of:

receiving a set of energy values, each energy value corresponding to a respective one of said fixed number of code values and corresponding index number;

searching a first subset of said set of energy values for a maximum energy value wherein said first subset contains each of said energy values corresponding to an index number having a binary equivalent with a "0" as a first digit;

searching a second subset of said set of energy values for a maximum energy value wherein said second subset contains each of said energy values corresponding to an index number having a binary equivalent with a "1" as said first digit;

forming a difference of said maximum energy value of said first subset and said maximum energy of said second subset wherein said difference is a measure of confidence of the value of a first digital of said original data signal;

searching a third subset of said set of energy values for a maximum energy value wherein said third subset contains each of said energy values corresponding to an index number having a binary equivalent with a "0" as an intermediate digit;

searching a fourth subset of said set of energy values for a maximum energy value wherein said fourth subset contains each of said energy values corresponding to an index number having a binary equivalent with a "1" as said intermediate digit;

forming a difference of said maximum energy value of said third subset and said maximum energy of said fourth subset wherein said difference is a measure of confidence of the value of an intermediate digit of said original data signal;

searching a fifth subset of said set of energy values for a maximum energy value wherein said fifth subset contains each of said energy values corresponding to an index number having a binary equivalent with a "0" as a last digit;

searching a sixth subset of said set of energy values for a maximum energy value wherein said sixth subset contains each of said energy values corresponding to an index number having a binary equivalent with a "1" as said last digit; and forming a difference of said maximum energy value of said fifth subset and said maximum energy of said sixth subset wherein said difference is a measure of confidence of the value of a last digit of said original data signal.

11. An apparatus for decoding an orthogonally encoded signal to produce a corresponding original signal comprising:

at least one demodulator for receiving and demodulating said encoded signal and providing groups of samples of said signal as an output;

at least one signal transformer connected to receive said groups of samples and to generate a plurality of soft decision data which each correspond to a measure of confidence that a data sample of said encoded signal is substantially similar to one orthogonal code from a set of mutually orthogonal codes, and said soft decision data each having a corresponding index symbol with a binary equivalent value which corresponds to one of said mutually orthogonal codes;

metric generation means coupled to said transformer for finding a set of paired data values, each paired data value of said set of paired data values corresponding to a digit of said binary equivalent of each of said index symbols, a first value of said paired data values corresponding to a maximum value of said soft decision data having a binary equivalent of said corresponding index symbol with a "0" as a corresponding digit and a second value of said paired data values corresponding to a maximum value of said soft decision data having a binary equivalent of said corresponding index symbol with a "1" as a corresponding digit, and for subtracting said second value from said first value of said paired data values so as to form a soft decision output value for each digit of said binary equivalent of said index symbols.

12. The apparatus of claim 11 further comprising conversion means for converting said resultant soft decision data to an estimate of said original signal.

13. The apparatus of claim 12 wherein said conversion means comprises a convolutional decoder.

14. The apparatus of claim 12 wherein said conversion means comprises a Viterbi decoder.

15. The apparatus of claim 11 wherein said paired data values correspond to dual-maxima aggregate data values.

16. The apparatus of claim 11 further comprising:

a plurality of demodulators for receiving and demodulating said encoded signal and providing groups of samples of said signal as outputs;

a plurality of signal transformers each connected to receive groups of samples from one of said demodulators and to generate a plurality of soft decision data which each correspond to a measure of confidence that a data sample of said encoded signal is substantially similar to one orthogonal code from a set of mutually orthogonal codes, and said soft decision data each having a corresponding index symbol which corresponds to one of said mutually orthogonal codes; and summation means coupled to said plurality of signal transformers for summing said plurality of soft decision data according to like corresponding index symbols to provide an aggregate plurality of soft decision data and corresponding index symbols, and having an output coupled to said metric generator.

17. A method of decoding an orthogonally encoded data signal corresponding to an original data signal, said orthogonally encoded data signal having a fixed number of possible code values each having an index number wherein a binary equivalent of said index number corresponds to said original data signal, comprising the steps of:

(a) receiving a set of energy values, each energy value corresponding to a respective one of said fixed number of code values and corresponding index number;

(b) determining a first resultant value from a first subset of said set of energy values according to a predetermined function wherein said first subset contains each of said energy values corresponding to an index number having a binary equivalent with a "0" as a first digit;

(c) determining a second resultant value from a second subset of said set of energy values according to said predetermined function wherein said second subset contains each of said energy values corresponding to an index number having a binary equivalent with a "1" as a first digit;

(d) forming a difference between said first resultant value and said second resultant value wherein said difference is a measure of confidence of the value of a particular digit of said original data signal; and (e) repeating steps (b), (c), and (d) for each subsequent digit of said binary equivalent for each index number.

18. The method of claim 17 wherein each energy value in said set of energy values is generated by an orthogonal code transformer.

19. The method of claim 17 wherein each energy value in said set of energy values is generated by summing a plurality of partial energy values corresponding to a like symbol index, each of said plurality of partial energy values corresponding to said like symbol index is generated by a different one of a plurality of orthogonal code transformers.

20. The method of claim 17 wherein said orthogonal code transformer comprises a fast Hadamard transformer.

21. The method of claim 19 wherein said plurality of orthogonal code transformers comprises a fast Hadamard transformer.

22. The method of claim 17 wherein said orthogonally encoded signal is a Walsh encoded signal.

23. The method of claim 17 wherein said measure of confidence represents a soft decision data value.

24. The method of claim 17 wherein said first and second resultant values are maxima and said predetermined function is a searching function for finding a maximum value.

25. The method of claim 17 wherein said predetermined function is a summation function for finding a sum of said set of values.

26. The method of claim 17 wherein said predetermined function is an exponential function of said set of values.

27. A method of decoding an orthogonally encoded data signal corresponding to an original data signal in a noncoherent receiver system, where the encoded data signal has a substantially constrained number of possible code values each in turn having an index number with an N-bit binary equivalent value which corresponds to said original data signal, comprising the steps of:

receiving a set of energy values, each corresponding to a respective one of said code values;

searching a first subset of said set of energy values which comprises those values having a binary equivalent for the index number with a "0" as a $k^{th}$ digit, where in k is an integer and $1 \leq k \leq N$, for a desired energy value determined by a preselected energy function;

searching a second subset of said set of energy values which comprises those values having a binary equivalent for the index number with a "1" as said $k^{th}$ digit, for a second desired energy value determined by said preselected energy function; and generating a sort decision value from a difference between said desired values for said first and second subsets.

28. The method of claim 27 further comprising the steps of repeating said searching and generating steps for first and second subsets for each other value of k.

29. The method of claim 27 wherein said soft decision value comprises a measure of confidence of the value of a particular digit of said original signal.

* * * * *